(12) United States Patent
Fong et al.

(10) Patent No.: US 12,147,824 B2
(45) Date of Patent: Nov. 19, 2024

(54) CONTAINER CLONING AND BRANCHING

(71) Applicant: EMC IP Holding Company LLC, Hopkinton, MA (US)

(72) Inventors: Victor Fong, Medford, MA (US); Xuebin He, Westwood, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 145 days.

(21) Appl. No.: 16/802,880

(22) Filed: Feb. 27, 2020

(65) Prior Publication Data

US 2021/0271499 A1    Sep. 2, 2021

(51) Int. Cl.
*G06F 9/455* (2018.01)
*G06F 16/901* (2019.01)

(52) U.S. Cl.
CPC ...... *G06F 9/45558* (2013.01); *G06F 16/9027* (2019.01); *G06F 2009/45562* (2013.01); *G06F 2009/4557* (2013.01); *G06F 2009/45575* (2013.01)

(58) Field of Classification Search
None
See application file for complete search history.

(56) References Cited

U.S. PATENT DOCUMENTS

| | | | | |
|---|---|---|---|---|
| 10,534,759 | B1* | 1/2020 | Manjunath | G06F 16/128 |
| 10,678,651 | B1* | 6/2020 | Borodin | G06F 9/45558 |
| 11,036,439 | B2* | 6/2021 | Alluboyina | G06F 3/067 |
| 11,106,455 | B2* | 8/2021 | Myers | G06F 9/44505 |
| 2012/0239739 | A1* | 9/2012 | Manglik | G06F 8/61 |
| | | | | 709/203 |
| 2021/0034423 | A1* | 2/2021 | Hallur | G06F 9/45558 |

OTHER PUBLICATIONS

Takano et al., Cooperative VM Migration for a Virtualized HPC Cluster with VMM-Bypass I/O devices, 2012, IEEE 8th International Conference on E-Science, pp. 1-8 (Year: 2012).*

* cited by examiner

*Primary Examiner* — Kenneth Tang
*Assistant Examiner* — Melissa A Headly
(74) *Attorney, Agent, or Firm* — Workman Nydegger

(57) ABSTRACT

Mechanisms of cloning containers to spawn offspring, orchestrate new containers on different execution environments, and enabling intra-container communication while maintaining parent-child relationships are disclosed.

18 Claims, 4 Drawing Sheets

CONTAINER CLONING AND BRANCHING

FIELD OF THE INVENTION

Embodiments of the present invention generally relate to containers and container related applications. More particularly, at least some embodiments of the invention relate to systems, hardware, software, computer-readable media, and methods for performing container related operations including, checkpoint operations and container cloning operations.

BACKGROUND

Container technologies such as docker and Kubernetes are examples of technologies to make applications portable able to operate in different environments. Although containers are generally portable to different computing environments, much of their portability exists due to the fact that the containers are usually stateless.

When a container has a state that needs to be remembered, the portability of containers decreases substantially. Refactoring a stateful process, for example, to be stateless is time-consuming and error-prone. More specifically, refactoring a container often requires a developer to externalize the stateful aspects (e.g., variables) of a container into external storage. Plus, there is currently no capability to clone a running container and, as a result, the developer is responsible for replicating states from the original container to new containers.

In addition to problems associated refactoring containers that have a state, developers have the responsibility of spawning new containers. Even though these containers can be created by connecting with the application programming interface (API) of the cloud orchestration stack, the ability to orchestrate these containers on new or specialized hardware remains difficult. In addition, conventional systems have limited ability to manage containers as a group. However, there is no ability to manage containers organized in different arrangements other than a general group level. More specifically, containers in groups have a group relationship, not any type of parent-child relationship.

In summary, conventional technologies complicate the ability of developers to maintain state and clone containers, orchestrate containers on specialized hardware, and manage different container relationships.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to containers and container related operations. More particularly, at least some embodiments of the invention relate to systems, hardware, software, computer-readable media, and methods for performing container related operations.

In general, example embodiments of the inventions perform container related applications including, but not limited to, cloning containers, managing container relationships, cloning containers with state related information, orchestrating containers in specified environments, running legacy applications in a distributed manner without major refactoring, multi-cloud cloning, or the like or combination thereof.

As previously stated, current container orchestration technology encourages developers to create stateless applications. However, a number of existing algorithms and long running processes are already programmed with state. As a result, a significant amount of research and software engineering effort is needed to refactor those workloads to become stateless.

Further, replicating context from stateful algorithms into new containers and maintaining these contexts have proven to be a challenge. Although these algorithms can still utilize container technology as a runtime environment, they are not utilizing the distributed capabilities to utilize horizontal scalability offered by these container technologies efficiently. For example, an evolutionary algorithm should utilize separated containers for each offspring in each generation, as each offspring would be optimized by utilizing a different hardware environment. Currently, programming and refactoring these algorithms is very difficult.

By using container related technologies, such as Docker, runC, CRIU, etc., snapshots of a running container can be performed so that the container can be restored at a different time or location.

Embodiments of the invention relate to a novel mechanism for cloning containers to spawn offspring, orchestrate the new containers on different execution environments, and empower the containers to communicate while maintaining parent-child relationships across containers. Based on implementation, embodiments of the invention can utilize different cloud and container technology stacks, making embodiments of the invention portable across different systems.

Embodiments of the invention allow containers to be cloned using checkpoint images, which can retain state. By restoring a checkpoint image into a new container as a clone, the new container can begin running with the existing state. The parent container can also continue running if necessary.

Figure 1:
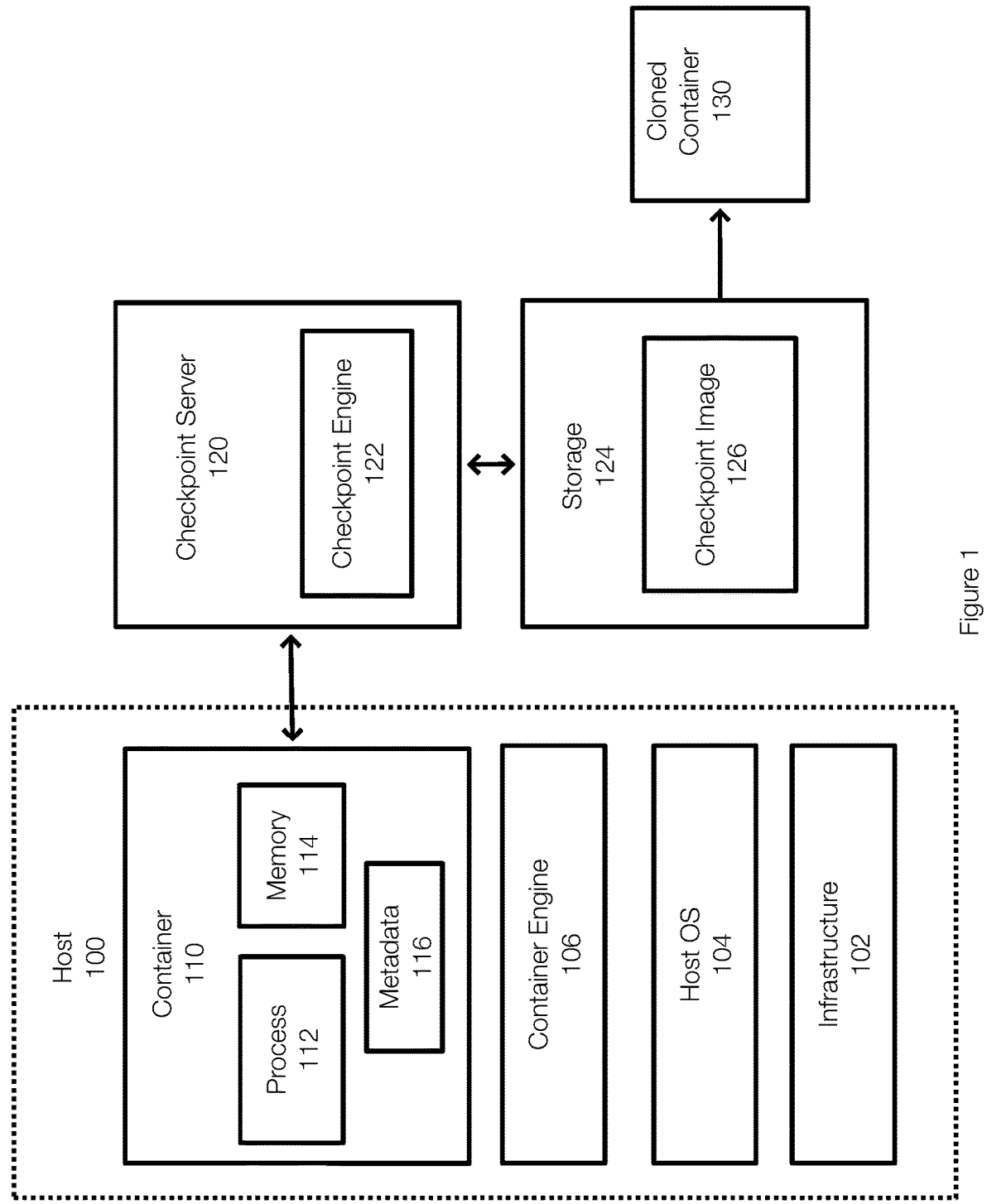
FIG. 1 illustrates an example of a checkpoint server that is configured to generate checkpoint images of running containers and start cloned containers from the checkpoint images.

FIG. 1 illustrates the process of generating checkpoint images and then generating a clone from the checkpoint image. FIG. 1 illustrates a host 100, which may support containers. The host 100 is associated with infrastructure 102 (e.g., hardware such as memory, processor, etc.). A host operating system (OS) 104 operates on the hardware and a container engine 106 operates on the host OS 104.

A container 110 is running on the host and is mounted or associated with the container engine 106 and the host OS 104. The container 110 is typically associated with a process 112, metadata 116 and memory 114. More specifically, the memory 114 refers to data associated with the container 110 and stored in the container's memory. As a result, the memory 114 stores tables, structures, and other data that may be used by the process 112.

A checkpoint server 120 is an example of a server that is configured to generate checkpoint images, as a page-server, and to restore or clone a container. IN this example, a checkpoint engine 122 performs operations related to checkpoint images and container restore operations.

More specifically, the checkpoint server 120 (or the checkpoint engine 122) initially generates a checkpoint image 126 of the container 110 and stores the checkpoint image 126 in a storage 124. The checkpoint image 126 can be generated by pausing the container 110 and then copying or dumping context into the checkpoint image 126. The context may include a memory dump. By storing the contents of the memory 114 into the checkpoint image 126, the state of the process 112 or of the container 110 is captured.

Once the checkpoint image 126 is generated, a cloned container 130 may be generated. The cloned container 130 is generated by restoring the checkpoint image 126 into a new container. When fully restored with the checkpoint image 126, the cloned container 130 has the needed state (at least because its memory has the same data as the parent container) and can begin serving requests in the context of a clone. At some point, operation of the container 110 may also resume.

The container 110 and the cloned container 130 thus have a parent-child relationship. Further, the containers 110 and 130 may be provided with a programmed communication channel that allows the parent and child clone to communicate more effectively.

Figure 2:
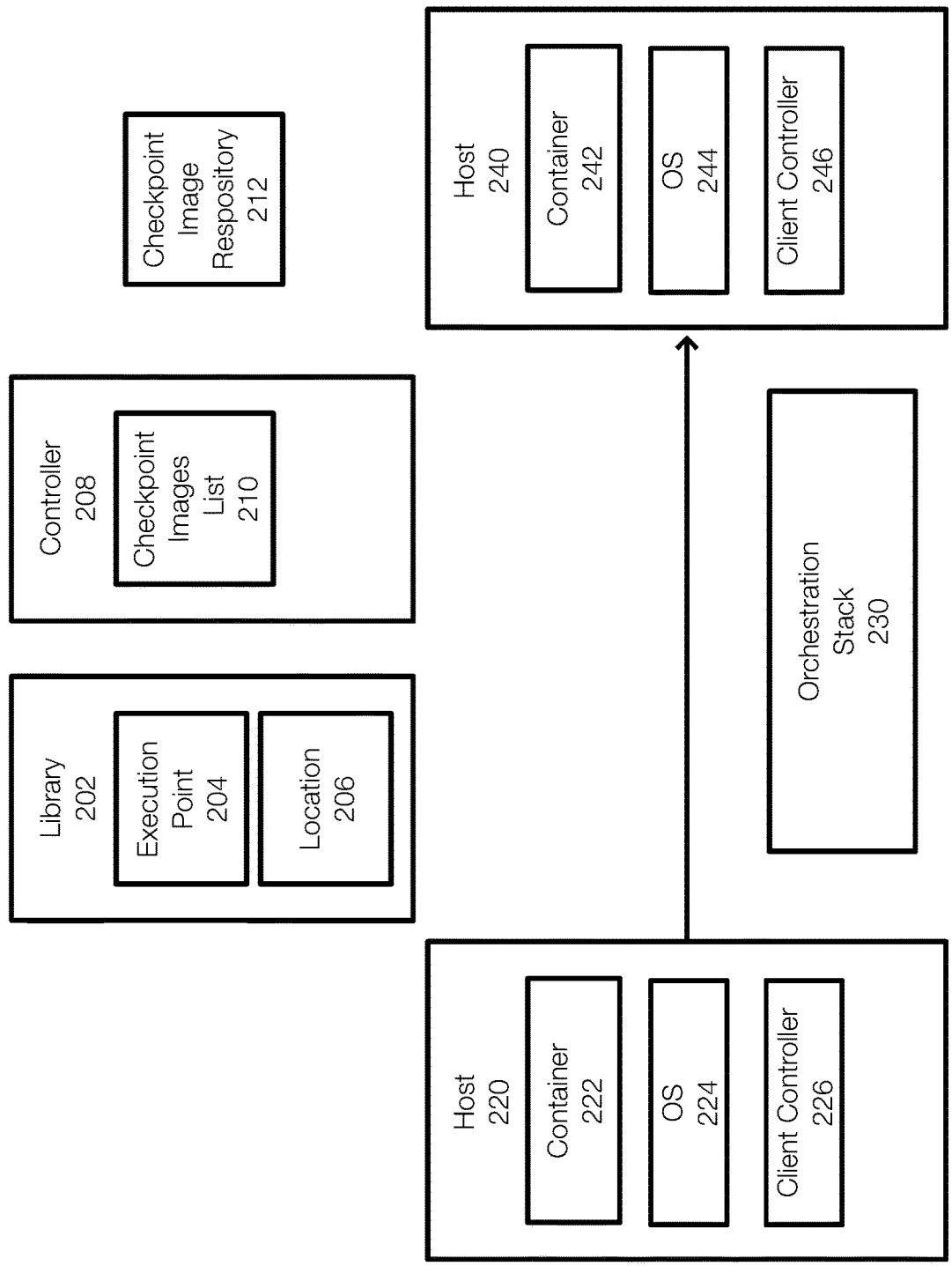
FIG. 2 illustrates an example of a running container that is cloned into a clone container while retaining context including state and while maintaining a parent-child relationship between container and the cloned container.

FIG. 2 illustrates an example of a system configured to execute or run applications or software in a distributed manner using cloning and branching. The various components, storage, hosts, containers, and other engines or pieces shown in FIG. 2 may be connected using network connections, internal machine connections, or the like.

FIG. 2 illustrates a library 202 and a controller 208. The library 202 and the controller 208 cooperate to clone containers (including the timing at which a container is cloned), orchestrate containers in different execution environments, empower the containers to communicate while maintaining parent-child relationships across containers, manage the containers when the containers are arranged in a tree-like arrangement (which is distinct from managing a group of containers), or the like or combination thereof.

The library 202 and the controller 208 can be implemented as part of a checkpoint server, as part of the orchestration stack, or on a host. In one example, the library includes an execution point 204. The execution point 204 identifies in code where, during the execution of a container, a cloning action or operation should occur. The library 202 also identifies a location 206 associated with the execution point 204. The location 206 identifies where to orchestrate the new or cloned container. This may be, for example, on specialized hardware or on another environment.

When cloning a container, a call to the controller 208 is performed. The call is a synchronized call that waits for the controller 208 to respond. The call may be made by the library 202 or by the container 222 in one example.

The communications used to implement the library 202 and the controller 208 may include message bus, HTTP, or the like. In one example, the library 202 communicates using the OS 224 or other operating system or filesystem with a client controller 226 mounted. The client controller 226 may act as a communication hub between the library 202 and the controller 208.

When the library 202 is invoked to clone an existing container such as the container 222, the controller 208 or the client controller 226 will pause the container 222 running on the original host 220. The controller 226 may use the orchestration stack 230 to make a checkpoint of the container 222. The checkpoint is stored in the checkpoint image repository 212. The controller 208 may also maintain a list 210 of checkpoint images that have been created and stored in the checkpoint image repository 212.

If this is the first time that the container 222 is being cloned, the entire image is stored in the repository 212. If a checkpoint image for the container 220 is already stored in the repository 212, the new checkpoint image may be an incremental checkpoint image.

After the checkpoint image is generated, the controller 208 may invoke the orchestration stack 230 to restore the checkpoint image into a new cloned container 242, which may be restored on a host 240 on an OS 244. The container 242 may also be associated with a client controller 246.

Once the container 242 is restored from the checkpoint image, the container 242 can resume operation at the exact point or waiting for a response from the controller 208. As previously stated, the call was a synchronous call and a response is required from the controller 208 in this example. The controller 208 may send a response to the client controller 246 mounted on the filesystem of the container 242 to proceed with new instructions or requests.

Multiple new containers can be cloned with different options in a single call. In addition, the cloned container 242 can use the same mechanism to clone itself. This effectively allows trees of containers to be formed and used. After restoring children containers, the parent container can be resumed or killed, depending on implementation. For example, after restoring the container 242 from a checkpoint image, the container 222 can be resumed or killed.

When a tree of containers are formed and there is a need to restore a leaf container, the checkpoint images of all of the leaf's parents can be used.

Figure 3:
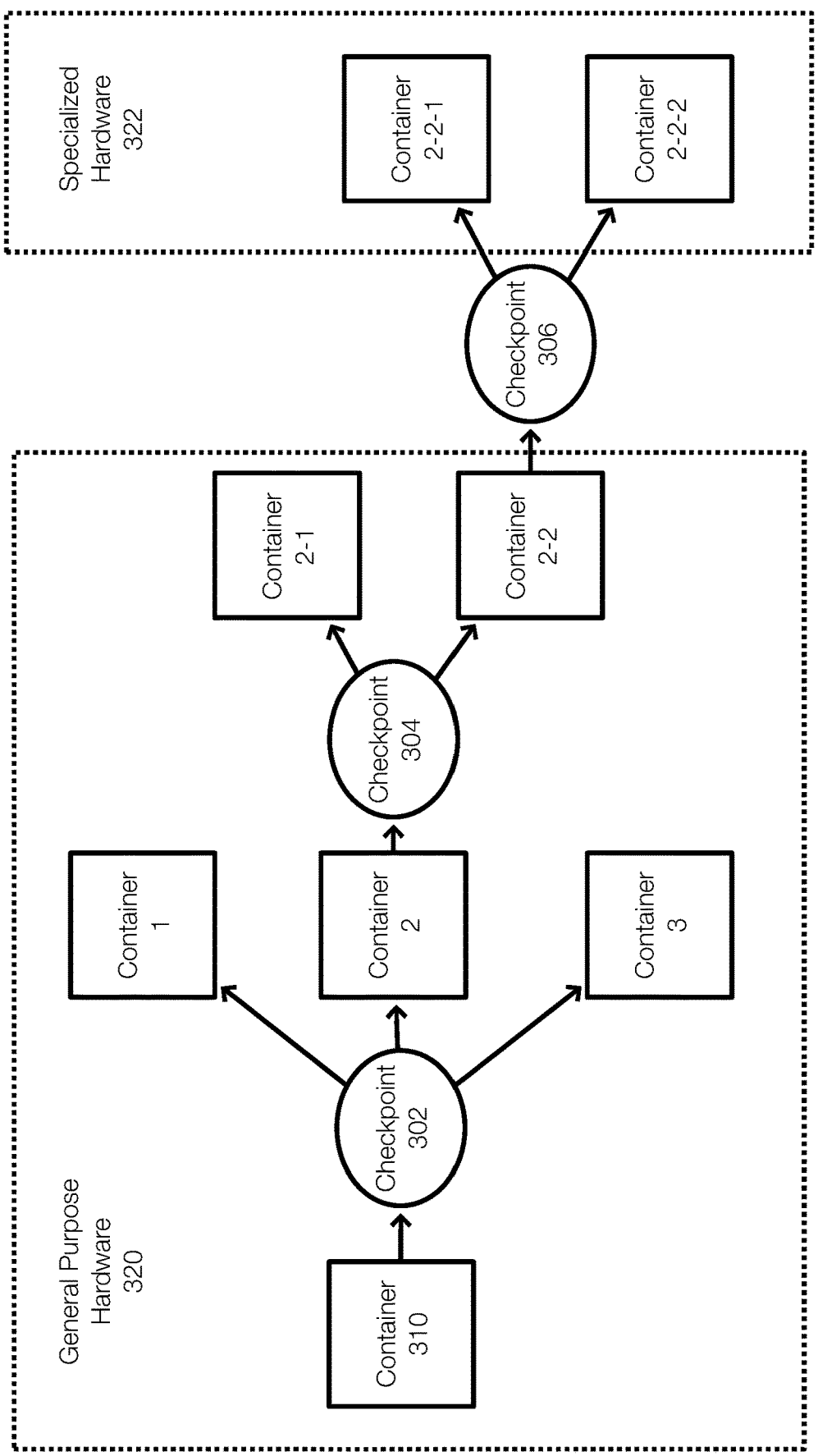
FIG. 3 illustrates an example of a tree structure for cloned containers and illustrates the ability to clone containers into specialized hardware environments that may be developer specified.

FIG. 3 illustrates an example of container branching and tree restoration. In FIG. 3, a checkpoint 302 is made for or from the original container 310. Using the checkpoint 302, clone containers 1, 2, and 3 are restored. After further execution, another checkpoint image 304 is generated. The checkpoint image 304 may be an incremental checkpoint image based on the checkpoint 302. The checkpoint image 302 can be used to generate clone containers 2-1 and 2-2. These are clones of the container 2. After additional execution, a checkpoint 306 is generated. The checkpoint image 306 may be incremental and based on the checkpoint image 302 and/or the checkpoint image 304. By restoring the checkpoint image 306, clone containers 2-2-1 and 2-2-2 are generated.

With reference to FIG. 2, the controller 208 can store the tree arrangement of containers illustrated in FIG. 3 in the checkpoint images list 210. This allows leaf containers or new clones to be created efficiently without storing full checkpoint images.

Based on input, the controller 210 can orchestrate new containers on developer-specified runtime environments and across multiple cloud service providers. In one example, when restoring a container from a checkpoint image, the container's rootfs image may be required. FIG. 3, for example, also illustrates that some of the clone containers can be deployed to specialized environments. For example, the containers 2-2-1 and 2-2-2 may be deployed to specialized hardware 322, which may include by way of example only hardware accelerators or the like. The other containers may operate on general purpose hardware 320.

As previously discussed, the communication between a parent and its direct children may includes a first-class communication channel. This allows applications that utilize the mechanisms discussed herein to more easily develop the communications between parent and child containers. The communication channel can be implemented with, by way of example and not limitation, Linux filesystem, HTTP message bus, or the like. The communication channel can be implemented, for IP based implementation, a default hostname and port for children containers to communicate back to the parent containers. A default hostname and port can be used for a parent container to broadcast a message to its children containers.

Regardless of how the containers implement the communication channel, the underlying implementation of the network may be based on the network configuration of the container orchestration stack.

Further, by tracking the parent-child relationships in the list 210, the controller 208 has the ability to manage a tree of containers by addressing the trunk. For example, if a user wants to kill or live-migrate the clone container 2 and all of its children, a user can reference an identifier of the container 2. This allows all of the children to be identified from the list. The containers may thus be associated with identifiers that identify their child and/or their parent. Further, when a container has more than one direct child, it is possible to follow a specific branch in the tree. Some of the branches can be killed. For example, migrating the container 2 may include the migration of the containers 2-2, 2-2-1 and 2-2-2. The container 2-1 may or may not be treated differently.

In one example, a specialized page-server could reduce the time required for checkpoint restoration using an incremental lazy-migration. In other words, the order in which a container accesses pages may be identified and stored. When restoring from a checkpoint image, the pages are transmitted in the order in which the pages are accessed. This may allow the cloned containers to begin operation without waiting for the entire checkpoint image to be downloaded and restored.

Figure 4:
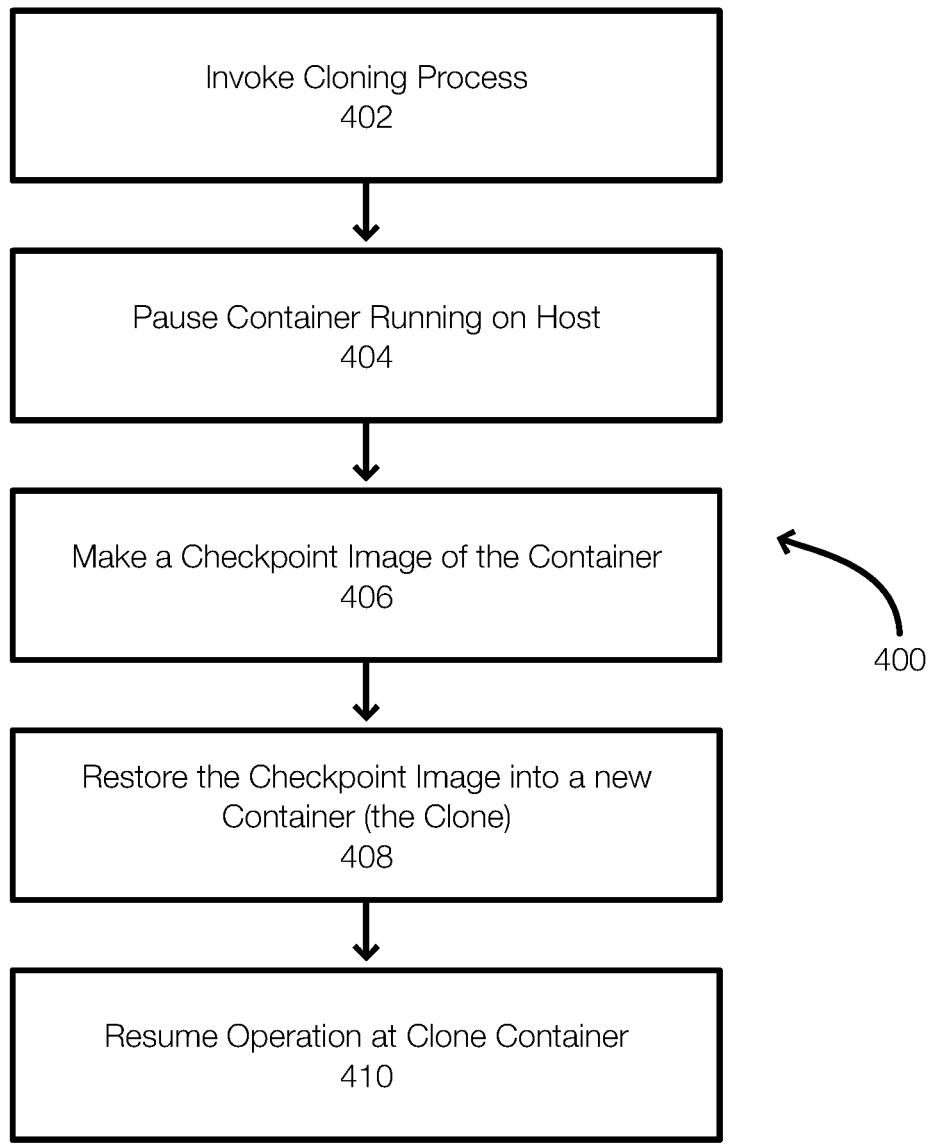
FIG. 4 illustrates an example of a method for running an application is a distributed style using container cloning and branching.

FIG. 4 illustrates an example of a method for running an application in a distributed style using container cloning and branching. The method 400 may begin by invoking 402 a cloning process. This may include involving a library, which may make a call to a controller. The library may store information that defines where in the execution of a container a container can or should be cloned. The library or other component by also identify where to clone the container. This is an example of how a developer may specify the environment in which to place the cloned container and to specify other settings of the clone container.

Once the controller is invoked, the container on the host is paused 404. This is typically a synchronize call that requires a response for the controller. As a result, in one embodiment, the paused container (and/or the clone container) may not resume operation until the controller responds to this call or otherwise authorized the container and/or the cloned container to resume operations.

Once the container on the host is paused, a checkpoint image is made 406. This includes dumping context (e.g., network settings, metadata, memory contents) into the checkpoint image. When a container is restored from the checkpoint image, operation can resume immediately when authorized. The controller may also maintain a list of checkpoint images and associated containers. The list may identify the containers by name or identification number. The list may also specify the relationships between the containers (e.g., parent-child, parent-children), which containers are leaf containers, or the like or combination thereof. The controller can also make a full checkpoint image or an incremental checkpoint image. For example, the first time a container is cloned typically results in a full checkpoint image. Cloning the child may result in an incremental checkpoint image.

Next, the checkpoint image is restored 408 into a new or cloned container at the specified location, which may be in the same cloud, on specific hardware, in another cloud, or the like. This may also include insuring that the appropriate layers (e.g., rootfs) are available to the cloned container. Once the cloned container is restored from the parent's checkpoint image, the cloned container can resume at the exact point of waiting for the controller's response to the synchronize call.

The clone container may then resume 410 operation in response to the controller's response to the call.

At this point, it may be possible to generate subsequent clones from the parent and/or the child. Thus, the tree of containers may grow and may thus implement a distributed application that does not require substantial refactoring.

Embodiments of the invention allow containers to be cloned with context using container checkpoint images. Using the checkpoint image mechanism, the ability to clone with context or state enables multiple use cases such as search, evolutionary, and dynamic programming. The cloning mechanisms further allows cloned containers to be cloned to and instantiated based on developer defined settings. This allows cloned containers to use different cloud services and runtime environments to optimize performance. Further, this ability can be used for A/B testing of different hardware environments.

Embodiments of the invention introduce parent-child relationships between containers. The ability to form and track containers with parent-child relationships allows operators to manage the containers based on the tree structure for, by way of example only, operations such as container termination, live-migration, backup, or the like or combination thereof.

Embodiments further provide a first class communication channel between a parent container and its direct children. This allows software to be programmed with a standard interface and allows the actual communication transmission to be abstracted out.

Incremental checkpoint images, particularly in a tree-based arrangement where parent-child relationships exist, allow leaf restorations to be performed using the checkpoint images of a branch of the tree. This is an example of incremental checkpoint imaging that reduces the size of the checkpoint images and alleviates the need to track the checkpoint images used by each clone container.

Embodiments allow legacy applications to run in a distributed style without major refactoring. More specifically, some applications have a lot of repeated similar workloads, such as for-loop statements. Normally, conventional software will run each option one after another inside for-loop lines. Embodiments of the invention, in contrast, make it possible to run all options inside the for-loop at the same time so that the parent container receives the best result much faster. Children containers can be restored, for example, for each option inside the for-loop.

The cloning mechanisms discussed herein allow a gain in performance and cost in multi-cloud environments. During the lifecycle of an application, different types of hardware resources may be preferred. For example, a machine learning application may need to process data, which can be done by a CPU and then have a need to run a machine learning algorithm that requires a certain amount of accelerator resources. Embodiments of the invention allow the first state to be performed in a container running on CPU heavy machines. The second stage can be performed in a cloned container running on GPU heavy machines.

For example, cloned containers can be implemented as a search space for automated machine learning frameworks. The cloning mechanisms can implement the search space to optimize an automated machine learning framework. If the auto machine learning framework is based on an evolutionary algorithm, the evaluation of each offspring can be executed into a cloned container.

In this example, the original container may be responsible for consolidating result comparisons and mating. Offspring of each generation would be evaluated in separate containers. The containers of each generation may be equal to the population size.

In this example, all the file pointers and network connections would also be cloned in each of the offspring containers. Offspring containers would still have access to the dataset and file pointers of the original container, making coding each frameworks a lot easier and execution parallelized.

In another example, the cloning mechanisms allow for a multi-cloud stateful migration platform. Because embodiments of the invention provide the capability to checkpoint and restore containers across multiple cloud service providers, it is useful to live-migrate stateful containers from one cloud to another cloud. This may not be useful for stateless containers, where a new container can simply be started in the other cloud. Multi-cloud stateful container migration platform. The implementation of this use case would be largely the same as the description. However, the original container would be terminated after the clone finishes or after the clone container begins accepting requests after being restored.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, container cloning operations, checkpoint image generation operations, checkpoint restore operations, or the like. More generally, the scope of the invention embraces any operating environment in which the disclosed concepts may be useful.

At least some embodiments of the invention provide for the implementation of the disclosed functionality in backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Microsoft Azure, Amazon AWS, and Google Cloud. More generally however, the scope of the invention is not limited to employment of any particular type or implementation of cloud storage.

In addition to the storage environment, the operating environment may also include one or more clients or containers that are capable of collecting, modifying, and creating, data. As such, a particular client or container may employ, or otherwise be associated with, one or more instances of each of one or more applications that perform such operations with respect to data.

Devices in the operating environment may take the form of software, physical machines, containers or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

Following are some further example embodiments of the invention. These are presented only by way of example and are not intended to limit the scope of the invention in any way.

Embodiment 1. A method, comprising: pausing a container running on a host, generating a checkpoint image of the running container, wherein the checkpoint image is stored in a checkpoint image storage, restoring the checkpoint image into a clone container on a second host, and resuming operation of the clone container at a point where the running container was paused.

Embodiment 2. The method of embodiment 1, further comprising invoking a library, wherein the library identifies an environment for the clone container, the environment including the second host.

Embodiment 3. The method of embodiments 1 and/or 2, further comprising storing the checkpoint image in a list maintained by a controller, wherein the list identifies a tree of containers that include a parent container and children of the container.

Embodiment 4. The method of embodiments 1, 2, and/or 3, further comprising cloning the clone container by generating a second checkpoint image of the clone container and restoring the second checkpoint image into a second clone container, wherein the second clone container is a child of the clone container.

Embodiment 5. The method of embodiments 1, 2, 3, and/or 4, wherein the second checkpoint image is an incremental checkpoint image.

Embodiment 6. The method of embodiments 1, 2, 3, 4, and/or 5, wherein the second host comprises specialized hardware.

Embodiment 7. The method of embodiments 1, 2, 3, 4, 5, and/or 6, wherein the running container is paused in response to a call that is synchronous, wherein the clone container resumes operation only when a response to the call is received by the clone container.

Embodiment 8. The method of embodiments 1, 2, 3, 4, 5, 6, and/or 7, further comprising, after resuming operation of the clone container, killing the running container or resuming operation of the running container.

Embodiment 9. The method of embodiments 1, 2, 3, 4, 5, 6, 7, and/or 8, further comprising establishing a communication channel for the running container and the clone container, wherein the communication channel includes one of a message bus or a default hostname and port.

Embodiment 10. The method of embodiments 1, 2, 3, 4, 5, 6, 7, 8, and/or 9, further comprising terminating, live-migrating or backing up all containers associated with a portion of the tree using the list.

Embodiment 11. The method recited in any of embodiments 1-10, wherein the method is performed by a server, an orchestration stack, a controller, a client controller, a library or any combination thereof.

Embodiment 12. A non-transitory storage medium having stored therein instructions that are executable by one or more hardware processors to perform the operations of any one or more of embodiments 1-11.

Embodiment 13. An apparatus configured to perform any of the embodiments discussed herein including embodiments 1-11.

Embodiment 14. The method of any of embodiments 1-11 or portion thereof.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device or environment.

The physical computing device or environment may include a memory which may include one, some, or all, of random access memory (RAM), non-volatile random access memory (NVRAM), read-only memory (ROM), and persistent memory, one or more hardware processors, non-transitory storage media, UI device, and data storage. One or more of the memory components of the physical computing device or environment may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    invoking a library to clone a container running on a host, wherein the invoking comprises acquiring from the library a predetermined execution point that identifies in code where, during execution of the running container, a cloning operation should occur, and a location of a second host, associated with the execution point, to which a clone of the running container is to be deployed;
    making, by the library, a synchronous call to a controller requesting that the running container be cloned;
    in response to the call, the controller performing:
        pausing the container at the execution point specified in the library;
        generating a checkpoint image of the running container, wherein the checkpoint image includes a memory dump of the running container and is stored in a checkpoint image storage;
        storing the checkpoint image as a child of the running container in a list maintained by the controller, wherein the list identifies a tree of containers that designate a container as a parent container and one or more other containers as children of the parent and leaf containers, wherein the tree of containers allows restoration of a leaf to be performed using checkpoint images in a corresponding branch of the tree of containers and wherein the running container and the clone container are included in the tree of containers;
        restoring the checkpoint image into a clone container on the second host that is specified in the library, wherein restoring the checkpoint image includes restoring the memory dump of the running container into the clone container; and
        issuing a response to the call to the clone container indicating that the clone container may proceed to new instructions or requests;
    in response to receiving the response, resuming operation of the clone container at the execution point; and
    resuming operation of the running container at the execution point.

2. The method of claim 1, wherein the library identifies an environment for the clone container, the environment including the second host and settings of the clone container.

3. The method of claim 1, further comprising cloning the clone container by generating a second checkpoint image of the clone container and restoring the second checkpoint image into a second clone container, wherein the second clone container is a child of the clone container.

4. The method of claim 3, wherein the second checkpoint image is an incremental checkpoint image, wherein the incremental checkpoint image has a smaller size compared to a full checkpoint image, wherein restoring the second checkpoint image includes restoring at least a portion from the checkpoint image.

5. The method of claim 1, wherein the second host comprises specialized hardware.

6. The method of claim 1, further comprising terminating, live-migrating or backing up all containers associated with a portion of the tree using the list.

7. The method of claim 1, further comprising selectively killing the running container.

8. The method of claim 1, further comprising establishing a communication channel for the running container and the clone container, wherein the communication channel includes one of a message bus or a default hostname and port.

9. The method of claim 1, wherein the containers in the tree of containers are configured to operate in a distributed style such that different children containers execute different aspects of a repeated workflow for a parent container.

10. The method of claim 9, further comprising restoring the children containers selectively such that each of the children containers is configured to perform a different portion of the repeated workflow.

11. A non-transitory storage medium having stored therein instructions that are executable by one or more hardware processors to perform operations, the non-transitory storage medium is not a propagation signal, the operations comprising:
    invoking a library to clone a container running on a host, wherein the invoking comprises acquiring from the library a predetermined execution point that identifies in code where, during execution of the running container, a cloning operation should occur, and a location of a second host, associated with the execution point, to which a clone of the running container is to be deployed;

making, by the library, a synchronous call to a controller requesting that the running container be cloned;

in response to the call, the controller performing:

pausing the container at the execution point specified in the library;

generating a checkpoint image of the running container, wherein the checkpoint image includes a memory dump of the running container and is stored in a checkpoint image storage;

storing the checkpoint image as a child of the running container in a list maintained by the controller, wherein the list identifies a tree of containers that designate a container as a parent container and one or more other containers as children of the parent and leaf containers, wherein the tree of containers allows restoration of a leaf to be performed using checkpoint images in a corresponding branch of the tree of containers and wherein the running container and the clone container are included in the tree of containers;

restoring the checkpoint image into a clone container on the second host that is specified in the library, wherein restoring the checkpoint image includes restoring the memory dump of the running container into the clone container; and issuing a response to the call to the clone container indicating that the clone container may proceed to new instructions or requests;

in response to receiving the response, resuming operation of the clone container at the execution point; and resuming operation of the running container at the execution point.

12. The non-transitory storage medium of claim 11 wherein the library identifies an environment for the clone container, the environment including the second host and setting of the clone container.

13. The non-transitory storage medium of claim 11, the operations further comprising cloning the clone container by generating a second checkpoint image of the clone container and restoring the second checkpoint image into a second clone container, wherein the second clone container is a child of the clone container.

14. The non-transitory storage medium of claim 13, wherein the second checkpoint image is an incremental checkpoint image, wherein the incremental checkpoint image has a smaller size compared to a full checkpoint image, wherein restoring the second checkpoint image includes restoring at least a portion from the checkpoint image.

15. The non-transitory storage medium of claim 11, wherein the second host comprises specialized hardware.

16. The non-transitory storage medium of claim 11, further comprising terminating, live-migrating or backing up all containers associated with a portion of the tree using the list.

17. The non-transitory storage medium of claim 11, the operations further comprising selectively killing the running container.

18. The non-transitory storage medium of claim 11, the operations further comprising establishing a communication channel for the running container and the clone container, wherein the communication channel includes one of a message bus or a default hostname and port.

* * * * *